United States Patent Office 3,812,064
Patented May 21, 1974

3,812,064
POLYANHYDRIDES USEFUL AS FLEXIBILIZING CURING AGENTS FOR EPOXY RESINS
Gus Nichols, Edwardsville, Pa., assignor to
General Electric Company
No Drawing. Filed Mar. 15, 1972, Ser. No. 235,027
Int. Cl. C08g 17/16
U.S. Cl. 260—18 EP
14 Claims

ABSTRACT OF THE DISCLOSURE

Relates to polyanhydrides suitable for use as flexibilizing curing agents for epoxy resins. Prepared by reacting abietic acid or a dehydrated castor oil fatty acid with maleic anhydride, maleic acid, methyl maleic acid, itaconic anhydride or fumaric acid and a high molecular weight polyoxylene polyol or polyoxylene polyamine.

BACKGROUND OF THE INVENTION

This invention relates to anhydrides suitable as flexibilizing curing agents for epoxy resins, which cured epoxy resins are used for insulating components such as insulators and wire enamels, particularly when flexibility is desired in the finished product.

The use of flexibilizers in curing epoxy resins to be used in electrical insulating materials is well known. Several types flexibilizers are available including long chain diacids. These diacid flexibilizers usually consist essentially either of dicarboxylic acid terminated long chain hydrocarbons or a dicarboxylic acid terminated polyester derived from a polycarboxylic acid and low molecular weight diols such as propylene glycol.

These materials have been used as curing agents for epoxy resins in the preparation of materials for outdoor insulators and for wire enamel.

The prior art flexibilizing polyacids have certain disadvantages when compared to the present composition which contains polyanhydrides based upon high molecular weight polyoxylene polyols or polyoxylene polyamines. A disadvantage of the polyacids is that during casting with an epoxy resin, the gelling and curing times may be unduly long. In order to obtain better properties of the cured epoxy resin, it is common practice to use mixtures of the flexibilizing diacid with anhydride curing agents. These mixed acid-anhydride curing agents tend to crystallize out on long standing indicating a separation of the components. The anhydrides themselves are usually solids, moreover, and need to be heated to become fluid before use.

SUMMARY OF THE INVENTION

It is therefore an object of my invention to provide a one component liquid flexibilizing polyanhydride composition.

It is another object of my invention to provide a flexibilized cured epoxy resin composition.

Briefly stated, the present invention relates to a composition derived from abietic acid or dehydrated castor oil fatty acid, maleic anhydride, maleic acid, methyl maleic acid, itaconic anhydride or fumaric acid, and a high molecular weight polyoxylene polyol or polyoxylene polyamine suitable as a flexibilizing curing agent for epoxy resins.

Another aspect of the invention is the cured epoxy resin composition obtained from reaction of the flexibilizing anhydride with epoxy resins.

DETAILED DESCRIPTION

As previously stated, the flexibilizing dianhydride composition of this invention comprises the reaction product of polyoxylene polyols or polyoxylene polyamines, abietic acid or dehydrated castor oil acid, which is also known as 9–11 acids, and maleic anhydride maleic acid, methyl maleic acid, itaconic anhydride or fumaric acid.

A polyoxylene diol, for example, can be defined as a diol terminated polymer based on olefinic oxides. If ethylene oxide is the monomer and the initiator is ethylene glycol, then the polymer is a diol terminated polyethylene oxide, often referred to as a polyoxyethylene diol. If a diamine is used instead of a diol as the initiator and propylene oxide as the monomer, the resulting polymer is a polypropylene oxide diamine, often referred to as a polyoxypropylene diamine. Using a triol or a triamine as the initiator and propylene oxide as the monomer results in polyoxypropylene triols or polyoxypropylene triamines which are also suitable for this invention. The molecular weight of the commercially available polyoxylene diols or triols may range from 150 to 10,000 or more. For the purpose of the present invention, the preferred molecular weights range from about 400 to about 6,500. Comparing the equal molecular weight polyoxypropylene diols to the polyoxyethylene diols, the former are preferred in the present invention because for a given molecular weight there is better flexibility due to the plasticizing effect of the extra methyl group. Polyoxypropylene diols up to 6,500 molecular weight are liquids while polyoxyethylene diols are liquids only up to about 1,000 molecular weight. Further, polyoxypropylene diols are less hydrophilic than polyoxyethylene diols due to larger hydrocarbon segments and form more stable esters due to the secondary alcohol group.

Abietic acid is a rosin acid. A typical composition of gum rosin comprises:

Rosin acids _____ 91 wt. percent.
Unsaponifiable __ 8.8 wt. percent (mostly hydrocarbons).
Ash (maximum) _ .05 wt. percent.
Moisture content _ None.

This rosin composition has the following properties:

Acid number _____ 167.
Saponification number _____ 171.
Softening point _____ 75° C. (107° F.).

The rosin acids are composed mainly of abietic acid and its isomer, levopimaric acid. Both acids contain a conjugated diene. In abietic acid, the conjugated diene is in two rings and as such it does not react with maleic anhydride or other dienophilic compounds in the Diels-Alder reaction. Levopimaric acid contains the conjugated diene in a single ring and it does react with maleic anhydride and other dienophilic compounds. Both of these acids are in equilibrium in rosin and any shifting in equilibrium, due to Diels-Alder reagents consuming the levopimaric acid, causes the isomerization of abietic acid to levopimaric acid. The shifting in equilibrium continues until all the abietic acid isomerizes to levopimaric acid. The final product, therefore, is an adduct of levopimaric acid and maleic anhydride.

The conjugated dienic system also yields the Diels-Alder addition reactions with fumaric acid and other dienophilic reagents.

Abietic acid has two reactive sites, the carboxylic groups and the conjugated dienic system. The carboxylic group yields all typical reactions of a sterically hindered cycloaliphatic acid for the present invention. The uniqueness of the abietic or leveopimaric acid structure is that the carboxylic group can be utilized to form various ester or amide derivatives before introducing the anhydride ring through a Diels-Alder reaction. In this way the final adducts will be terminated in anhydride groups.

A rather high temperature is required for the esterification of abietic acid with polyoxylene polyols or polyamines. This is attributed to steric hindrance in the acid and to the reactivity of the polyoxylene polyols or polyamines due to their large molecular size and consequently reduced mobility.

9–11 acids are obtained by the dehydration of castor oil fatty acids and can be used in place of abietic acid in the present invention.

The polyanhydrides may be prepared by reacting together a mixture containing .80–1 mole of a polyoxylene polymer such as a polyoxylene polyol or a polyoxylene polyamine; 2–2.40 moles of an acidic material including maleic anhydride, maleic acid, methyl maleic acid, itaconic anhydride or fumaric acid; and 2–2.40 moles of abietic acid or a dehydrated castor oil fatty acid.

Specific examples of compositions for preparing polyoxylene diabietate dianhydrides are as follows:

EXAMPLE I (TWO STEP METHOD)

In a two liter resin kettle equipped with a motor stirrer, a thermometer, a nitrogen bubbler and connected to a water condenser through a water trap were charged 400 grams (1 mole) of polyoxypropylene diol-400 (molecular weight) and 670 grams of rosin containing 90% acids. Since the rosin used contained 90% rosin acids, this is equivalent to 604 grams (2 moles) of abietic and levopimaric acid. The temperature was raised to 300° C. under continuous stirring in a nitrogen atmosphere. Within two hours 8 cc. of water was collected. Then the temperature was raised to 340° C. and kept there for four hours until a total of 36 cc. of water was collected. At that point the heat was turned off and the mixture, with continuous stirring in a nitrogen atmosphere, was allowed to cool to 140° C. At that temperature 196 grams (2 moles) of maleic anhydride were added in four portions over a period of 40 minutes. The reaction was exothermic requiring the rate of addition of the maleic anhydride to be regulated to avoid a too rapid and violent reaction. Then the temperature was slowly raised to 200° C. and kept there for one additional hour. The heat was turned off and the final product was allowed to cool to room temperature.

EXAMPLE II (TWO STEP METHOD)

| | Moles |
|---|---|
| Polyoxypropylene diol-1000 | 1 |
| Abietic acid | 2 |
| Maleic anhydride | 2 |

The same equipment, procedures and identical conditions were followed as in Example I. The product was a very fluid liquid.

Mixtures of polyoxylene polyols may be used to give properties not attainable with only one diol. The following example is typical:

EXAMPLE III

| | Moles |
|---|---|
| Polyoxypropylene diol-1000 | 0.2 |
| Polyoxypropylene diol-400 | 0.8 |
| Abietic acid | 2.0 |
| Maleic anhydride | 2.0 |

The same equipment, procedures and identical conditions were followed as in Example I. The final product was a fluid liquid at room temperature.

Examples IV, V, VI and VII were made respectively from polyoxypropylene diol-150 and polyoxyethylene diol-400, -1000 and -1540, using the same molar ratios, equipment, procedures and conditions followed in Example I. The final products were solid at room temperature.

The reaction can also be carried out in one step, rather than in the two steps used in the preceding Examples. The one step reaction is typified in the following Example.

EXAMPLE VIII (ONE STEP METHOD)

The ingredients of Example III were all charged at once into a 2 liter glass resin kettle and heated slowly to 280° C. The temperature was held at 280 to 300° C. for four and one half hours until 36 cc. of water was collected. The heat was turned off and upon cooling to 100° C. the product was identical with the product of Example III except it had a much lighter color. In this one step reaction, it is believed the diols first react with the more reactive maleic anhydride to form the half ester because anhydrides have faster reaction rates than acids. Then the adduct of the maleic anhydride half ester and abietic acid is formed, followed by internal transesterification and anhydride ring closure at the highest reaction temperature to give the same product as was formed in the two step reaction of Example III.

Similar reactions can be carried out with 9–11 acids alone or in mixture with abietic acid, as shown by

EXAMPLE IX (ONE STEP METHOD)

| | Moles |
|---|---|
| 9–11 acids | 1.0 |
| Abietic acid | 1.0 |
| Polyoxypropylene diol-400 | 1.0 |
| Maleic anhydride | 2.4 |

The above ingredients were charged into a two liter glass resin kettle and the same steps were followed as in Example VIII. The final product was a fluid liquid. 9–11 acids can add up to 1.5 moles of maleic anhydride per mole of 9–11 acids so it was necessary in this example to use sufficient maleic anhydride to reflect this increased consumption.

In place of the polyoxylene polyols, polyoxylene polyamines can be used. The resulting polyanhydrides contain amide links rather than ester links. The following is an example of a one step reaction with a mixture of polyoxylene diamines:

EXAMPLE X

| | Moles |
|---|---|
| Polyoxypropylene diamine-400 | 0.8 |
| Polyoxypropylene diamine-1000 | 0.2 |
| Abietic acid | 2.0 |
| Maleic anhydride | 2.0 |

The above ingredients were charged into a two liter glass resin kettle equipped with a motor stirrer, a thermometer, a nitrogen bubbler and connected to a water condenser through a water trap. Because of the exothermic reaction between the maleic anhydride and the diamines, the resin kettle was cooled in a bath of salted ice. When the exothermic reaction ceased, the temperature was slowly brought up to 280° C. and kept there for four hours until 36 mls. of water were collected. The final product was a fluid diamido abietate-dianhydride having an acid number of 160 which corresponds to a dianhydride structure and not to a dibasic acid structure.

EXAMPLE XI

| | Moles |
|---|---|
| Polyoxypropylne triamine-400 | 0.60 |
| Polyoxypropylene diamine-1000 | 0.20 |
| Abietic acid | 2.20 |
| Maleic anhydride | 2.20 |

The same equipment, procedures and identical conditions were followed as in Example IX. The product was a fluid liquid.

The use of a tertiary amine catalyst, i.e. tris-dimethylaminomethyl phenol (available commercially as DMP–30 from Rohm and Haas Co.) or various metal salts such as stannous octoate, during the preparation of these anhydrides is beneficial because the catalyst reduces the reaction time approximately 30% and the reactions proceed at least 30–50° C. below the uncatalyzed ones. Instead of stannous octoate, proportional quantities of stannous salts of abietic acid or 9–11 acids can be made in situ. In this case the catalyst is an integral part of the anhydride. If the anhydride is to be used as a curing agent for epoxy resins, the catalyst may be left in and will serve as an accelerator in the epoxy resin curing step. The following example shows the use of such catalyst in the preparation of the anhydride:

EXAMPLE XII

| | | |
|---|---|---|
| Polyoxypropylene triamine-400 | moles | 0.40 |
| Polyoxypropylene diol-400 | do | 0.40 |
| Polyoxypropylene diamine-1000 | do | 0.20 |
| Abietic acid | do | 2.40 |
| Maleic anhydride | do | 2.40 |
| DMP-30 | grams | 15 |

The ingredients were all charged while cooling in a salted ice bath. When the exothermic reaction ceased, the mixture was slowly heated to 265° C. for three and one half hours. The theoretical amount of water was collected and the final product was a liquid ester-amido-anhydride.

It has been stated previously that the polyanhydrides of this invention may be used as flexibilizing curing agents for epoxy resins. This is known in the art as an epoxy resin system. These curing agents are effective in the curing of any vicinal epoxy compound containing at least two reactive groups

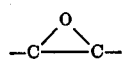

in the molecule. The epoxy group can be contained in any type of organic compound having a saturated or unsaturated aliphatic, cycloaliphatic, aromatic or heterocyclic structure. The vicinal epoxy compound should have an epoxy equivalency greater than one. This is a term widely recognized in the art and is defined in U.S. Pat. 2,633,458 to Shokol.

The following examples using the polyanhydrides of this invention are illustrative:

EXAMPLE XIII

The following materials were used:

| | Grams |
|---|---|
| Cycloaliphatic epoxy resin (Union Carbide Corp. #4221) | 100 |
| Polyanhydride of Example I containing 3 grams DMP-30 | 400 |
| Aluminum trihydrate | 750 |
| Pigment paste (any of the commercially available ones suitable for preparing a desired color) | 6 |

The composition was prepared in two steps by mixing separately two components known as A and B. (A) the epoxy resin, the pigment paste, and 208 grams of aluminum trihydrate and (B) the polyanhydride plus the remaining 542 grams of aluminum trihydrate. A and B were then mixed together and heated to a temperature of about 80° C. to form a liquid. The liquid was poured into a mold and cured at a temperature of about 100° C. but not exceeding 200° C. The preferred curing temperature is about 150° C.–180° C. Tht curing time depends upon the temperature selected. For example, the mixture may be cured at a temperature of about 100° C. for about twenty four hours.

EXAMPLE XIV

| | Grams |
|---|---|
| Cycloaliphatic epoxy resin | 100 |
| Polyanhydride of Example II containing 4 grams DMP-30 | 595 |
| Aluminum trihydrate | 1625 |
| Pigment paste | 10 |

The composition was prepared in two steps by mixing separately (A) the epoxy resin, the pigment paste, plus 240 grams of aluminum trihydrate and (B) the polyanhydride and the remaining 1385 grams of aluminum trihydrate, and then combining the A and B mixes. The conditions for preparing the cured composition are the same as given in Example XIII.

EXAMPLE XV

| | Grams |
|---|---|
| Cycloaliphatic epoxy resin | 100 |
| Polyanhydride of Example III containing 4 grams DMP-30 | 440 |
| Aluminum trihydrate | 1000 |
| Pigment paste | 7.5 |

The composition was prepared in two steps by mixing separately (A) the epoxy resin, the pigment paste, plus 202 grams of aluminum trihydrate and (B) the polyanhydride plus the remaining 798 grams of aluminum trihydrate, and then combining the A and B mixes. The conditions for preparing the cured composition are the same as given in Example XIII.

EXAMPLE XVI

| | Grams |
|---|---|
| Cycloaliphatic epoxy resin | 100 |
| Eesteroanhydride of Example IX containing 3 grams DMP-30 | 337 |
| Aluminum trihydrate | 817 |
| Pigment paste | 7 |

The composition was prepared in two steps by mixing separately (A) the epoxy resin, the pigment paste, plus 203 grams aluminum trihydrate, and (B) the polyanhydride plus the remaining 614 grams of aluminum trihydrate, and then combining the A and B mixes. The conditions for preparing the cured composition are the same as given in Example XIII.

EXAMPLE XVII

| | Grams |
|---|---|
| Cycloaliphatic epoxy resin | 100 |
| Amido anhydride of Example XI containing 4 grams DMP-30 | 400 |
| Aluminum trihydrate | 929 |
| Pigment paste | 7 |

The composition was prepared in two steps by mixing separately A and B. (A) the epoxy resin, the pigment paste, plus 227 grams aluminum trihydrate and (B) the polyanhydride plus the remaining 800 grams of aluminum trihydrate, and then combining the A and B mixes. The conditions for preparing the cured composition are the same as given in Example XIII.

EXAMPLE XVIII

| | Grams |
|---|---|
| Epoxy resin | 100 |
| Esteramido anhydride based on Example XII containing 4.3 grams DMP-30 | 440 |
| Aluminum trihydrate | 1003 |
| Pigment paste | 7 |

The composition was prepared in two steps by mixing separately A and B. (A) the epoxy resin, the pigment paste, plus 203 grams aluminum trihydrate and (B) the polyanhydride and the remaining 800 grams of aluminum trihydrate, and then combining the A and B mixes. The conditions for preparing the cured composition are the same as given in Example XIII.

Although the above examples use cycloaliphatic epoxy resins as typified by Union Carbide Corporation's #4221, other cycloaliphatic, aromatic, aliphatic and heterocyclic based epoxy resins may also be used after adjusting for the epoxy equivalency content, as known in the art.

As many widely different embodiments of this invention may be made without departing from the spirit and scope thereof, it is to be understood that this invention is not limited to the specific embodiments except as defined in the appended claims.

What is claimed as new and desired to be secured by Letters Patent of the United States is:

1. A method of preparing flexibilizing polyanhydrides which comprises (1) reacting together a mixture containing the following ingredients:

(a) .80–1 mole of a high molecular weight polyoxylene polymer selected from the group consisting of polyoxylene polyols, polyoxylene polyamines and mixtures thereof;

(b) 2–2.40 moles of an acidic material selected from the group consisting of maleic anhydride, maleic acid, methyl maleic acid, itaconic anhydride and fumaric acid; and (c) 2–2.40 moles of a compound selected from the group consisting of abietic acid and a dehydrated castor oil fatty acid; (2) heating the mixture at a temperature of from about 280–300° C. for about four and one-half hours and (3) collecting water from the mixture reaction; and (4) formation of the mixture reaction product having anhydride and terminations.

2. The flexibilizing polyanhydride product prepared by the process of claim 1 wherein the polyoxylene polymer has a molecular weight of between 400 and 6500.

3. The flexibilizing polyanhydride product prepared by the process of claim 1 wherein the polyoxylene polymer is a polyoxypropylene diol.

4. The flexibilizing polyanhydride product prepared by the process of claim 1 wherein the polyoxylene polymer is a polyoxypropylene diamine.

5. The flexibilizing polyanhydride product prepared by the process of claim 1 comprising the following mixture of ingredients:

| | Moles |
|---|---|
| Polyoxypropylene diol molecular weight-400 | 1 |
| Abietic acid | 2 |
| Maleic anhydride | 2 | said product having anhydride terminations on each end of the product chain.

6. The flexibilizing polyanhydride product prepared by the process of claim 1 comprising the following mixture of ingredients:

| | Moles |
|---|---|
| Polyoxypropylene diol molecular weight-1000 | 0.2 |
| Polyoxypropylene diol molecular weight-400 | 0.8 |
| Abietic acid | 2.0 |
| Maleic anhydride | 2.0 |

7. The flexibilizing polyanhydride prepared by the process of claim 1 comprising the following mixture of ingredients:

| | Moles |
|---|---|
| Dehydrated castor oil fatty acid | 1.0 |
| Abietic acid | 1.0 |
| Polyoxypropylene diol molecular weight-400 | 1.0 |
| Maleic anhydride | 2.4 |

8. The flexibilizing polyanhydride product prepared by the process of claim 1 comprising the following mixture of ingredients:

| | Moles |
|---|---|
| Polyoxypropylene triamine molecular weight-400 | 0.60 |
| Polyoxypropylene diamine molecular weight-1000 | 0.20 |
| Abietic acid | 2.20 |
| Maleic anhydride | 2.20 |

9. The polyanhydride product prepared by the process of claim 1 containing a catalyst selected from the group consisting of tris dimethylamino methyl phenol and a metal salt.

10. The flexibilizing polyanhydride product prepared by the process of claim 1 comprising the following mixture of ingredients:

| | |
|---|---|
| Polyoxypropylene triamine molecular weight-400 moles | 0.40 |
| Polyoxypropylene diol molecular weight-400 do | 0.40 |
| Polyoxypropylene diamine molecular weight-1000 do | 0.20 |
| Abietic acid do | 2.40 |
| Maleic anhydride do | 2.40 |
| Tris-dimethylaminomethyl phenol grams | 15 |

11. A curable composition comprising an epoxy resin and a curing agent therefore comprising the reaction product of claim 5 wherein the epoxy resin and the curing agent are present in the ratio of about 1:5.95 parts by weight.

12. A curable composition comprising an epoxy resin and a curing agent therefor comprising the reaction product of claim 6 wherein the epoxy resin and the curing agent are present in the ratio of about 1:4 parts by weight.

13. A curable composition comprising an epoxy resin and a curing agent therefor comprising the reaction product of claim 8 wherein the epoxy resin and the curing agent are present in the ratio of about 1:4 parts by weight.

14. A curable composition comprising an epoxy resin and a curing agent therefor comprising the reaction product of claim 10 wherein the epoxy resin and the curing agent are present in the ratio of about 1:4 parts by weight.

References Cited

UNITED STATES PATENTS

| | | | |
|---|---|---|---|
| 2,569,495 | 10/1951 | Rheineck | 260—26 |
| 2,909,496 | 10/1959 | Cooke, Jr. et al. | 260—26 |
| 2,889,294 | 6/1959 | Layman, Jr. | 260—26 |
| 2,973,332 | 2/1961 | Fikentscher et al. | 260—26 |
| 1,978,598 | 10/1934 | Peterson | 260—24 |
| 2,679,515 | 5/1054 | DeGroote | 260—18 |
| 2,877,195 | 3/1959 | McNabb | 260—18 |
| 3,371,070 | 2/1968 | Chang et al. | 260—18 |
| 3,582,509 | 6/1971 | Staniak et al. | 260—24 |
| 3,299,008 | 1/1967 | Mueller | 260—18 |
| 3,642,695 | 2/1972 | Barnett et al. | 260—18 |

FOREIGN PATENTS

| | | | |
|---|---|---|---|
| 328,190 | 4/1930 | Great Britain | 260—24 |
| 376,276 | 6/1932 | Great Britain | 260—24 |

DONALD E. CZAJA, Primary Examiner

E. C. RZUCIDLO, Assistant Examiner

U.S. Cl. X.R.

260—2 EA, 22 EP, 27 R, 47 EA, 97.5